United States Patent
Kim et al.

(10) Patent No.: US 9,745,514 B2
(45) Date of Patent: Aug. 29, 2017

(54) PHOTO-ALIGNMENT COMPOSITION AND METHOD OF MANUFACTURING A DISPLAY PANEL USING THE SAME

(71) Applicant: Samsung Display Co., Ltd., Yongin, Gyeonggi-Do (KR)

(72) Inventors: Su-Jeong Kim, Seoul (KR); Jun-Woo Lee, Seongnam-si (KR); Jin-Soo Jung, Hwaseong-si (KR)

(73) Assignee: Samsung Display Co., Ltd., Samsung-ro, Giheung-Gu, Yongin-Si, Gyeonggi-Do (KR)

(*) Notice: Subject to any disclaimer, the term of this patent is extended or adjusted under 35 U.S.C. 154(b) by 429 days.

(21) Appl. No.: 14/573,119

(22) Filed: Dec. 17, 2014

(65) Prior Publication Data
US 2016/0017229 A1    Jan. 21, 2016

(30) Foreign Application Priority Data
Jul. 15, 2014    (KR) .......................... 10-2014-0089090

(51) Int. Cl.
*C09K 19/56* (2006.01)
*G02F 1/1337* (2006.01)

(52) U.S. Cl.
CPC ........ *C09K 19/56* (2013.01); *G02F 1/133788* (2013.01); *G02F 1/133723* (2013.01)

(58) Field of Classification Search
CPC ......... G02F 1/133788; G02F 1/133723; C09K 19/56
See application file for complete search history.

(56) References Cited

U.S. PATENT DOCUMENTS

| 5,053,480 A | * | 10/1991 | Koto | C08G 73/10 528/125 |
| 5,607,732 A | * | 3/1997 | Miyamoto | G02F 1/133723 349/124 |
| 7,790,248 B2 | * | 9/2010 | Tomioka | G02F 1/1337 349/135 |

FOREIGN PATENT DOCUMENTS

| JP | 2007304215 A | 11/2007 |
| KR | 1020070002656 A | 1/2007 |
| KR | 1020080109686 A | 12/2008 |

* cited by examiner

*Primary Examiner* — Mathieu Vargot
(74) *Attorney, Agent, or Firm* — Robert E. Bushnell, Esq.

(57) ABSTRACT

A photo-alignment composition includes a compound comprising a repeat unit represented by Chemical Formula 1 and a solvent. The photo-alignment composition is coated on a first substrate and a second substrate facing the first substrate, thus forming alignment layers. A liquid crystal layer is formed between the first substrate and the second substrate. The photo-alignment composition includes a compound structure having a high decomposition rate and a functional group capable of a hydrogen bond, which is weaker than a covalent bond. Thus, a hardness of the alignment layer may be improved at a room temperature, and a hydrogen bonding functional group of the photo-alignment composition may be decomposed at a high temperature thus photo-aligning the alignment layer. Therefore, an afterimage of a screen may decrease, and a hardness of the alignment layer may increase.

20 Claims, 3 Drawing Sheets

PHOTO-ALIGNMENT COMPOSITION AND METHOD OF MANUFACTURING A DISPLAY PANEL USING THE SAME

CLAIM OF PRIORITY

This application makes reference to, incorporates into this specification the entire contents of, and claims all benefits accruing under 35 U.S.C. §119 from an application for PHOTO-ALIGNMENT COMPOSITION AND METHOD OF MANUFACTURING DISPLAY PANEL USING THE SAME, earlier filed in the Korean intellectual Property Office on Jul. 15, 2014 and there duly assigned Serial No. 10-2014-0089090.

BACKGROUND OF THE INVENTION

Field of the Invention

Exemplary embodiments of the inventive concept, the present invention, relate to a photo-alignment composition and a method of manufacturing a display panel using the same. More particularly, exemplary embodiments of the inventive concept relate to a photo-alignment composition capable of improving a hardness of an alignment layer and an afterimage of a display panel and a method of manufacturing a display panel using the photo-alignment composition.

Description of the Related Art

A liquid crystal display apparatus is one of a flat panel display FPD, which is used broadly recently. Examples of the flat panel display include, but are not limited to, a liquid crystal display ("LCD"), a plasma display panel ("PDP") and an organic light emitting display ("OLED").

The liquid crystal display apparatus applies voltages to molecules of liquid crystal to adjust arrangements of the molecules thereby changing optical characteristics of a liquid crystal cell such as birefringence, optical activity, dichroism and light scattering to display an image.

The liquid crystal display apparatus includes a display panel and a backlight assembly. Molecules of liquid crystal of the display panel needs to be aligned in a direction to have uniform brightness and high contrast ratio.

Generally, a polyimide compound is coated on substrates of a display panel, and then the substrates are rubbed by a rubbing cloth to form an alignment layer. However, when the substrates are rubbed by the rubbing cloth, impurities may be attached on the alignment layer or scratches may be formed on the alignment layer.

Recently, a photo aligning process is used to improve transmissivity and to decrease defects. An alignment layer manufactured by the photo aligning process may have an improved transmissivity. However, a hardness of the alignment layer manufactured by the photo aligning process is weaker than an alignment layer manufactured by a rubbing process. Furthermore, an afterimage may occur on a screen.

SUMMARY OF THE INVENTION

Exemplary embodiments of the inventive concept provide a photo-alignment composition capable of improving a hardness of an alignment layer and an afterimage of a display panel.

Exemplary embodiments of the inventive concept also provide a method of manufacturing a display panel using the photo-alignment composition.

According to an exemplary embodiment of the present invention, a photo-alignment composition may include a compound and a solvent. The compound may include a repeat unit represented by the following Chemical Formula 1,

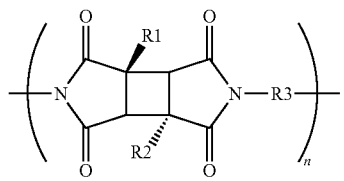

<Chemical Formula 1>

R1 and R2 may respectively represent an alkyl group having 1 to 20 carbons. At least one hydrogen atom of the alkyl group may be substituted by a hydrogen bonding functional group represented by the following Chemical Formula 2 to the following Chemical Formula 7. R3 may represent a diamine group. n may be a natural number.

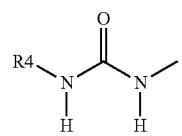

<Chemical Formula 2>

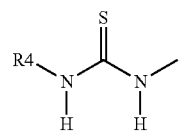

<Chemical Formula 3>

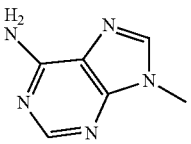

<Chemical Formula 4>

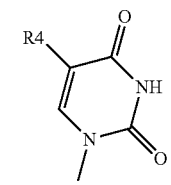

<Chemical Formula 5>

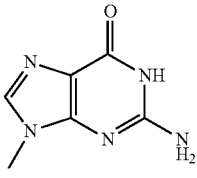

<Chemical Formula 6>

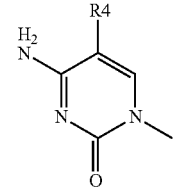

<Chemical Formula 7>

R4 may represent an alkyl group having 1 to 20 carbons.

In an exemplary embodiment of the present invention, at least two hydrogen bonding functional groups of adjacent molecules may form an intermolecular hydrogen bond.

In an exemplary embodiment of the present invention, a terminal of the hydrogen bonding functional group may include a nitrogen atom forming a covalent bond with the alkyl group.

In an exemplary embodiment of the present invention, the Chemical Formula 4 may be an adenine group, the Chemical Formula 5 may be a thymine group, the Chemical Formula 6 may be a guanine group, the Chemical Formula 7 may be a cytosine group, and the adenine group may be bonded to the thymine group, the guanine group may be bonded to the cytosine group.

In an exemplary embodiment of the present invention, the compound may be formed by a condensation polymerization reaction of cyclobutane-1,2,3,4-tetracarboxylic dianhydride derivative represented by the following Chemical Formula 8 and a diamine compound.

<Chemical Formula 8>

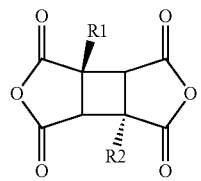

In the Chemical Formula 8, definitions of R1 and R2 may be the same as described above.

In an exemplary embodiment of the present invention, the diamine compound may include

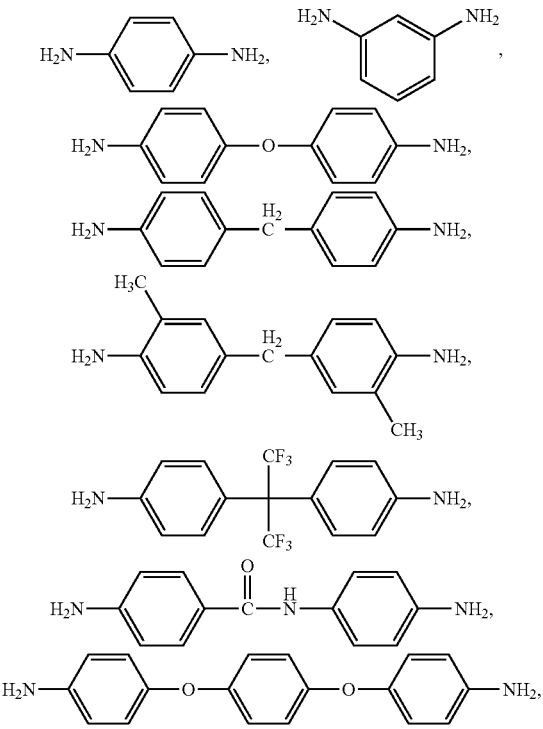

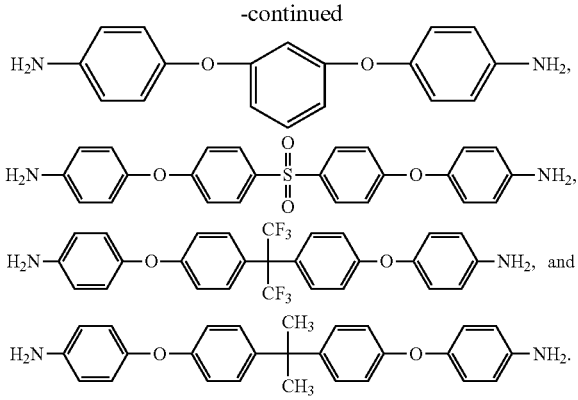

In an exemplary embodiment of the present invention, R3 may be derived from the diamine compound, and R3 may include an aromatic group and the aromatic group may be

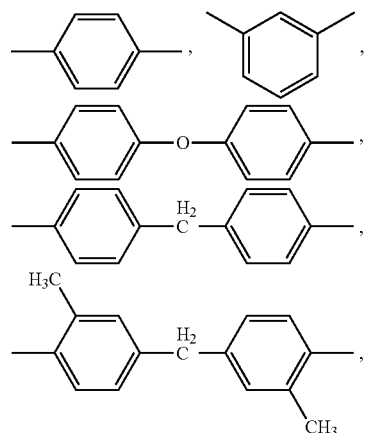

In an exemplary embodiment of the present invention, at least one hydrogen atom of the aromatic group may be substituted by the hydrogen bonding functional group represented by the Chemical Formula 2 to the Chemical Formula 7.

In an exemplary embodiment of the present invention, R3 further may include a linker positioned at a terminal of the aromatic group. The linker may include an alkyl group having 1 to 20 carbons. At least one hydrogen atom of the linker may be substituted by the hydrogen bonding functional group represented by the Chemical Formula 2 to the Chemical Formula 7.

In an exemplary embodiment of the present invention, the photo-alignment composition may absorb light having a wavelength range of about 200 nm to about 300 nm.

In an exemplary embodiment of the present invention, a weight-average molecular weight of the compound may be within a range of about 100,000 to about 1,000,000.

In an exemplary embodiment of the present invention, the solvent may include chlorobenzene, N-methyl pyrrolidone, dimethyl sulfoxide, dimethyl formamide, toluene, chloroform, γ-butyrolactone, methyl cellosolve, butyl cellosolve, butyl carbitol and tetrahydrofuran.

In accordance with an exemplary embodiment of the present invention, a method of manufacturing of a display panel using a photo-alignment composition may be provided. An alignment layer may be formed by coating a photo-alignment composition on a first substrate and a second substrate. The second substrate may be facing the first substrate. The photo-alignment composition may include a compound including a repeat unit represented by the following Chemical Formula 1, and a solvent.

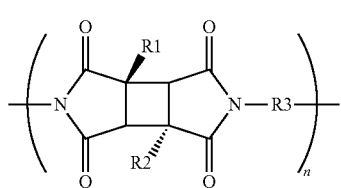
<Chemical Formula 1>

A liquid crystal layer may be formed between the first substrate and the second substrate.

In the Chemical Formula 1, R1 and R2 respectively represent an alkyl group having 1 to 20 carbons. At least one hydrogen atom of the alkyl group may be substituted by a hydrogen bonding functional group represented by the following Chemical Formula 2 to the following Chemical Formula 7. R3 represents a diamine group. n is a natural number.

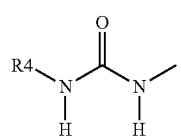
<Chemical Formula 2>

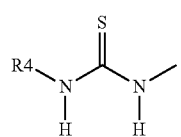
<Chemical Formula 3>

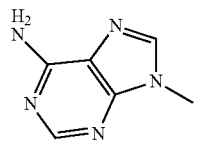
<Chemical Formula 4>

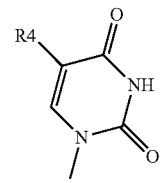
<Chemical Formula 5>

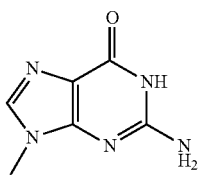
<Chemical Formula 6>

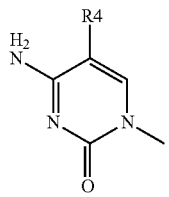
<Chemical Formula 7>

In the Chemical Formulae 2-7, R4 represents an alkyl group having 1 to 20 carbons.

In an exemplary embodiment of the present invention, a terminal of the hydrogen bonding functional group may include a nitrogen atom forming a covalent bond with the alkyl group.

In an exemplary embodiment of the present invention, the photo-alignment composition may be coated on the first substrate and the second substrate. The coated first substrate and the coated second substrate may be firstly baked. Light having a wavelength range of about 200 nm to about 300 nm may be irradiated to the coated first substrate and the coated second substrate. The coated first substrate and the coated second substrate may be secondly baked.

In an exemplary embodiment of the present invention, the compound may be formed by a condensation polymerization reaction of cyclobutane-1,2,3,4-tetracarboxylic dianhydride derivative represented by the following Chemical Formula 8, and a diamine compound.

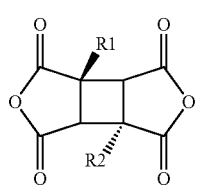
<Chemical Formula 8>

In the Chemical Formula 8, definitions of R1 and R2 may be the same as described above.

In an exemplary embodiment of the present invention, the diamine compound may include

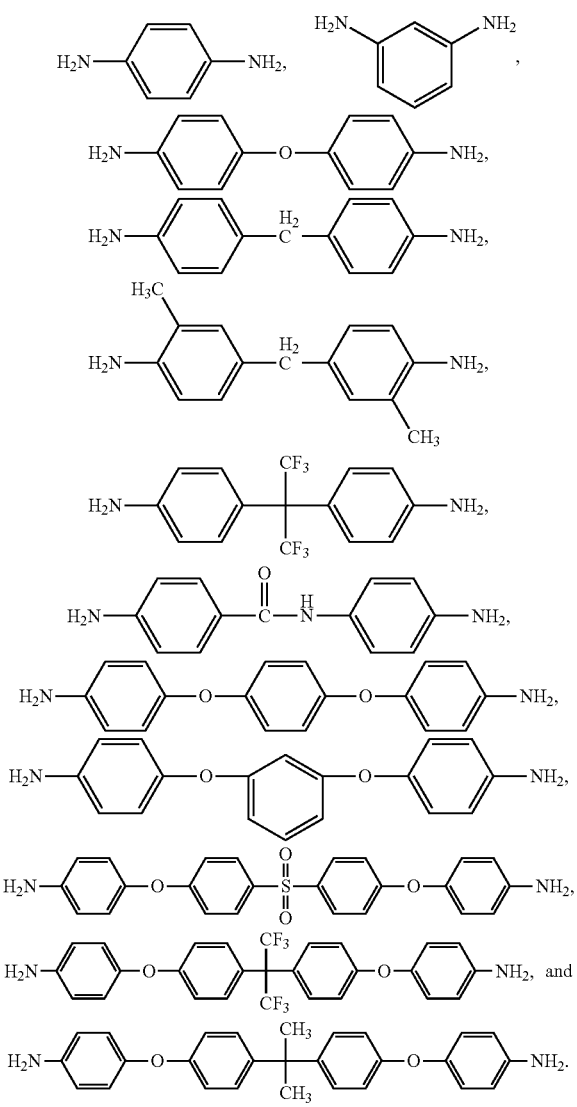

In an exemplary embodiment of the present invention, R3 may be derived from the diamine compound, and R3 comprises an aromatic group comprising at least one selected from the group consisting of

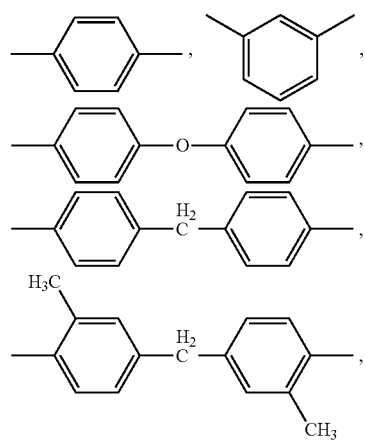

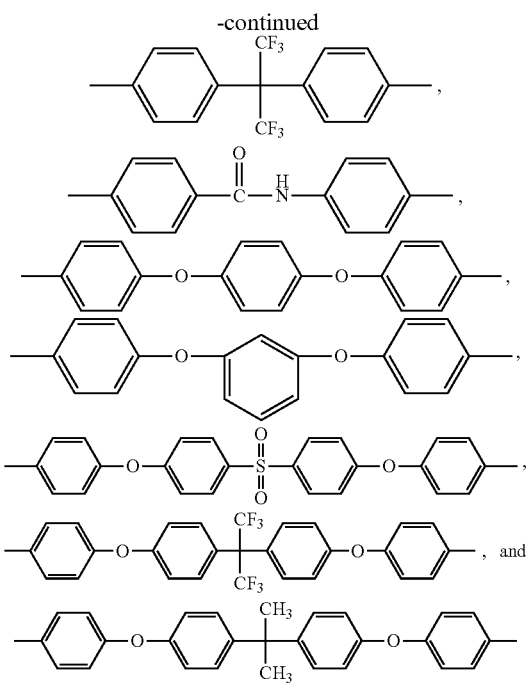

In an exemplary embodiment of the present invention, at least one hydrogen atom of the aromatic group may be substituted by a hydrogen bonding functional group represented by the Chemical Formula 2 to the Chemical Formula 7.

In an exemplary embodiment of the present invention, diamine compound may further include a linker including an alkyl group having 1 to 20 carbons. At least one hydrogen atom of the linker may be substituted by the hydrogen bonding functional group represented by the Chemical Formula 2 to the Chemical Formula 7.

In such embodiments, the photo-alignment composition may include a compound structure having a high decomposition rate and a functional group capable of a hydrogen bond, which is weaker than a covalent bond. Thus, a hardness of an alignment layer may be improved at a room temperature, and the hydrogen bond may be decomposed at a high temperature thus photo-aligning the alignment layer. Therefore, an afterimage of a screen may decrease, and a hardness of the alignment layer may increase.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
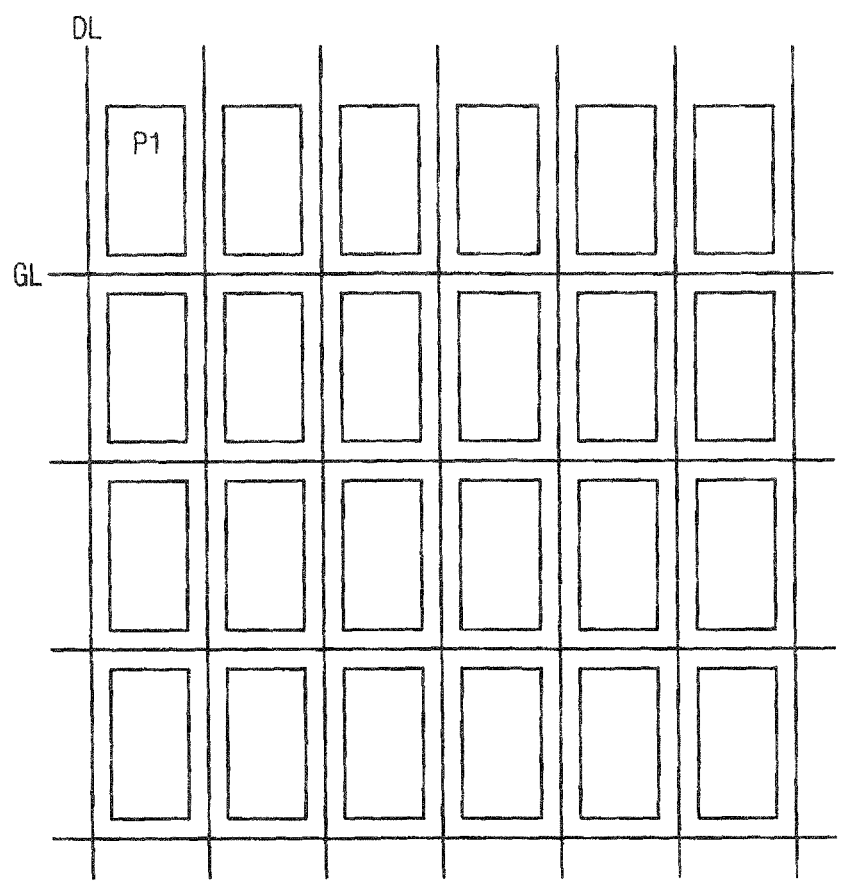
FIG. 1 is a plan view of a display panel according to an exemplary embodiment of the present invention.
Figure 1:
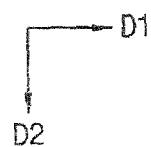

The present invention will be described more fully with reference to the accompanying drawings, in which exemplary embodiments of the invention are shown. The drawings and description are to be regarded as illustrative in nature and not restrictive. Hereinafter, exemplary embodiments of the present inventive concept will be explained in detail with reference to the accompanying drawings.

A Photo-Alignment Composition

The photo-alignment composition may include a compound and a solvent, the compound may include a repeat unit represented by the following Chemical Formula 1.

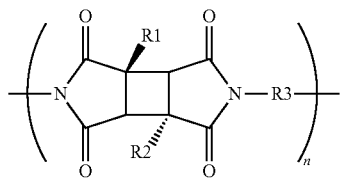
<Chemical Formula 1>

The compound may be a polyimide compound. The compound may include a structure represented by the Chemical Formula 1 including cyclobutane dianhydride derivative.

$R_1$ and $R_2$ may respectively represent an alkyl group having 1 to 20 carbons. R3 may represent a diamine group. n may be a natural number.

At least one hydrogen atom of the alkyl group may be substituted by a hydrogen bonding functional group represented by the following Chemical Formula 2 to the following Chemical Formula 7.

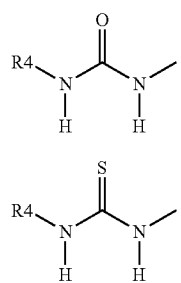
<Chemical Formula 2>

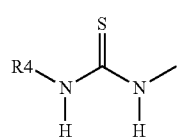
<Chemical Formula 3>

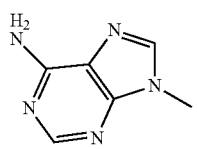
<Chemical Formula 4>

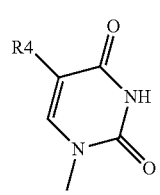
<Chemical Formula 5>

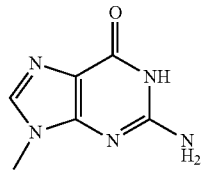
<Chemical Formula 6>

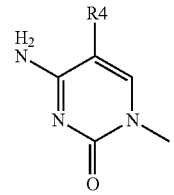
<Chemical Formula 7>

R4 may represent an alkyl group having 1 to 20 carbons.

A hydrogen bond may be an attraction between an atom having a high electronegativity and a hydrogen. For example, the high electronegativity atom may be a fluorine atom, an oxygen atom, a nitrogen atom, a sulfur atom or the like.

The hydrogen bond may be intermolecular or intramolecular. When the hydrogen bond is intermolecular, a hardness of the alignment layer may be increased. When the hydrogen bond is intramolecular, a hardness of the alignment layer may be decreased. A bond energy of the hydrogen bond may be about 5 kJ/mole to about 30 kJ/mole, which is stronger than a van der Waals force, but is weaker than a covalent bond or an ionic bond.

Hydrogen bonding functional groups of adjacent molecules may form an intermolecular hydrogen bond.

A terminal of the hydrogen bonding functional group represented by the Chemical Formula 2 to the Chemical Formula 7 may include a nitrogen atom. The nitrogen atom may form a covalent bond with a carbon atom of the alkyl group. The nitrogen atom in the terminal of the hydrogen bonding functional group may act as a nucleophile during synthesizing the compound.

For example, the hydrogen bonding functional group may be urea group or thio-urea group. The Chemical Formula 2 is the urea group, and the Chemical Formula 3 is the thio-urea group.

When the photo alignment composition includes a hydrogen bonding functional group represented by the Chemical Formula 2, adjacent molecules have an intermolecular hydrogen bond represented by the following Chemical Formula 2-1.

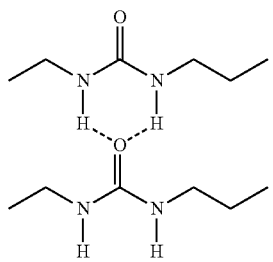
<Chemical Formula 2-1>

When the photo alignment composition includes a hydrogen bonding functional group represented by the Chemical Formula 3, adjacent molecules have an intermolecular hydrogen bond represented by the following Chemical Formula 3-1.

<Chemical Formula 3-1>

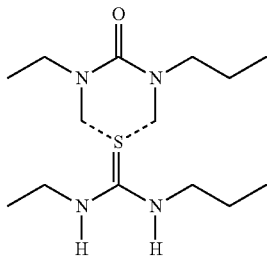

For example, the hydrogen bonding functional group may be an adenine group, a thymine group, a guanine group or a cytosine group. The Chemical Formula 4 is the adenine group, the Chemical Formula 5 is the thymine group, the Chemical Formula 6 is the guanine group, and the Chemical Formula 7 is the cytosine group.

For example, the Chemical Formula 4 and the Chemical Formula 5 may have an intermolecular hydrogen bond represented by the following Chemical Formula 4-1. Two intermolecular hydrogen bonds may occur between the adenine group and the thymine group.

<Chemical Formula 4-1>

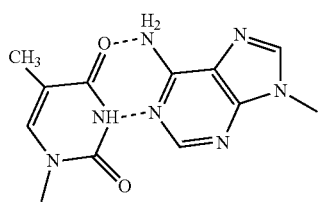

For example, the Chemical Formula 6 and the Chemical Formula 7 may have an intermolecular hydrogen bond represented by the following Chemical Formula 6-1. Three intermolecular hydrogen bonds may occur between the guanine group and the cytosine group.

<Chemical Formula 6-1>

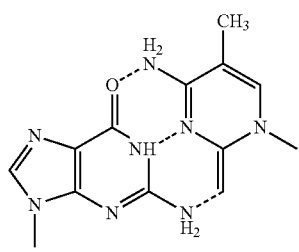

Therefore, the photo alignment composition may include a compound having the hydrogen bonding functional group, so that a hardness of the alignment layer coated by the photo alignment composition may be improved by the intermolecular hydrogen bond at a room temperature. However, the intermolecular hydrogen bond may be decomposed at a high temperature, so that the compound having the hydrogen bonding functional group may be rearranged by a photo aligning, thus improving an afterimage of the alignment layer.

The compound may be formed by a condensation polymerization reaction of cyclobutane-1,2,3,4-tetracarboxylic dianhydride derivative represented by the following Chemical Formula 8 and a diamine compound.

<Chemical Formula 8>

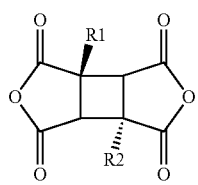

In the Chemical Formula 8, definitions of R1 and R2 may be the same as described above.

For example, the diamine compound may be

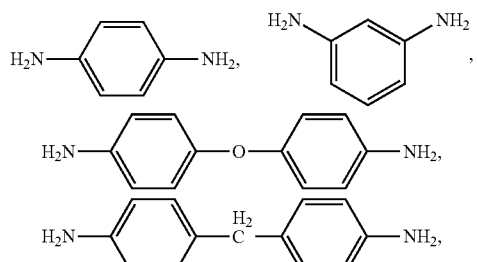

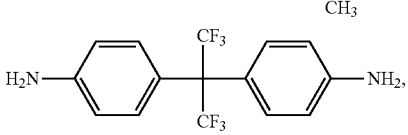

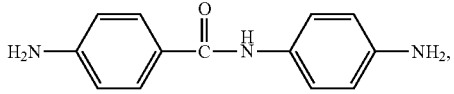

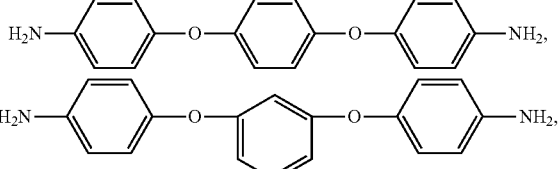

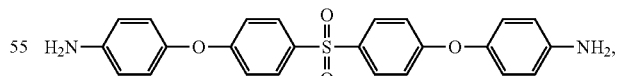

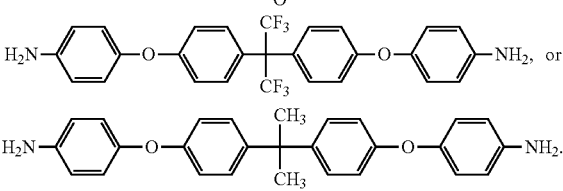

The R3 may be derived from the diamine compound. For example, the R3 may include an aromatic group, such as

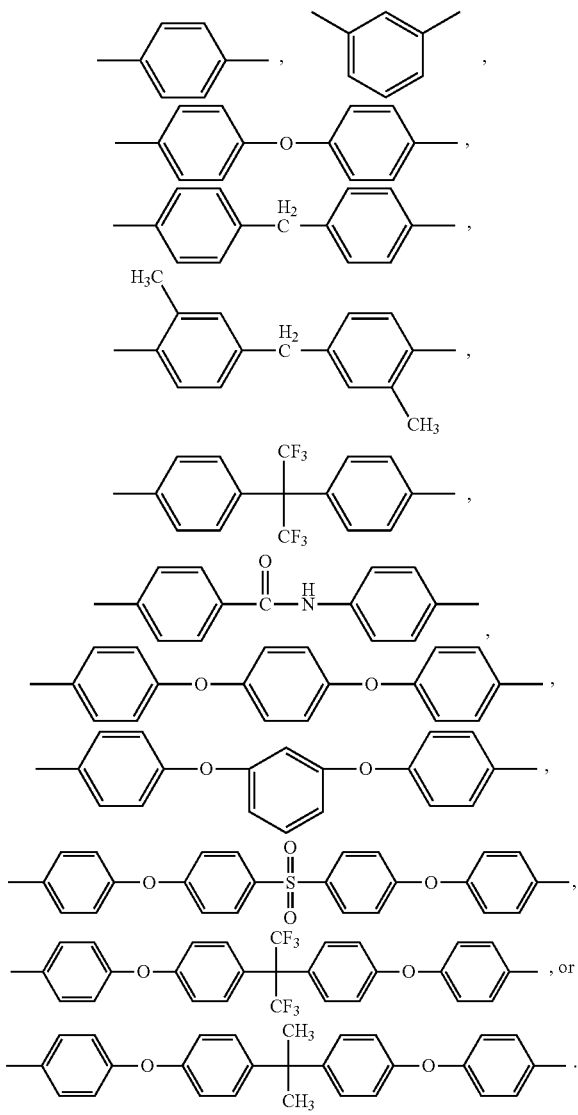

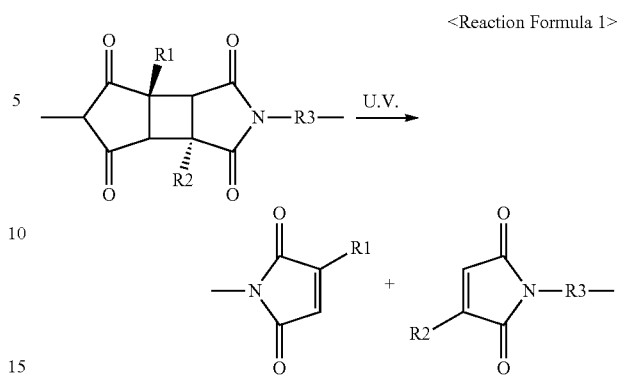

<Reaction Formula 1>

Therefore, the R3 may include at least one benzene ring.

At least one hydrogen atom of the benzene ring of the aromatic group may be further substituted by the hydrogen bonding functional group represented by the Chemical Formula 2 to the Chemical Formula 7.

Furthermore, the diamine group may include a linker positioned at a terminal of the aromatic group including an alkyl group having 1 to 20 carbons. At least one hydrogen atom of the linker may be substituted by the hydrogen bonding functional group represented by the Chemical Formula 2 to the Chemical Formula 7.

Thus, a hardness of the alignment layer coated by the photo alignment composition may be increased by a hydrogen bond between the adjacent hydrogen bonding functional groups.

The photo alignment composition may absorb light having a wavelength range of about 200 nm to about 300 nm. For example, the photo alignment composition may absorb light having a wavelength of 254 nm.

When the photo alignment composition absorbs the light having a specific wavelength, a structural unit represented by the Chemical Formula 1 may be decomposed by the following Reaction Formula 1.

A polarizer may be disposed on an outer surface of substrates, and then ultraviolet rays may irradiate to the polarizer. Thus, the ultraviolet rays may be polarized by a desired direction, thus irradiating on the alignment layer.

Therefore, the compound arranged in a polarized direction may be decomposed, so that anisotropy of the alignment layer coated by the photo alignment composition may increase. The compound may be rearranged in a vertical direction to the polarized direction, so that an orientation of the alignment layer may be improved.

A weight-average molecular weight of the compound may be within a range of about 100,000 to about 1,000,000. For example, the weight-average molecular weight of the compound may be equal to or more than 500,000. When the weight-average molecular weight of the compound is less than 100,000, a stain may occur on a screen.

For example, the solvent may be chlorobenzene, N-methyl pyrrolidone, dimethyl sulfoxide, dimethyl formamide, toluene, chloroform, γ-butyrolactone, methyl cellosolve, butyl cellosolve, butyl carbitol, tetrahydrofuran or a mixture thereof.

Figure 2:
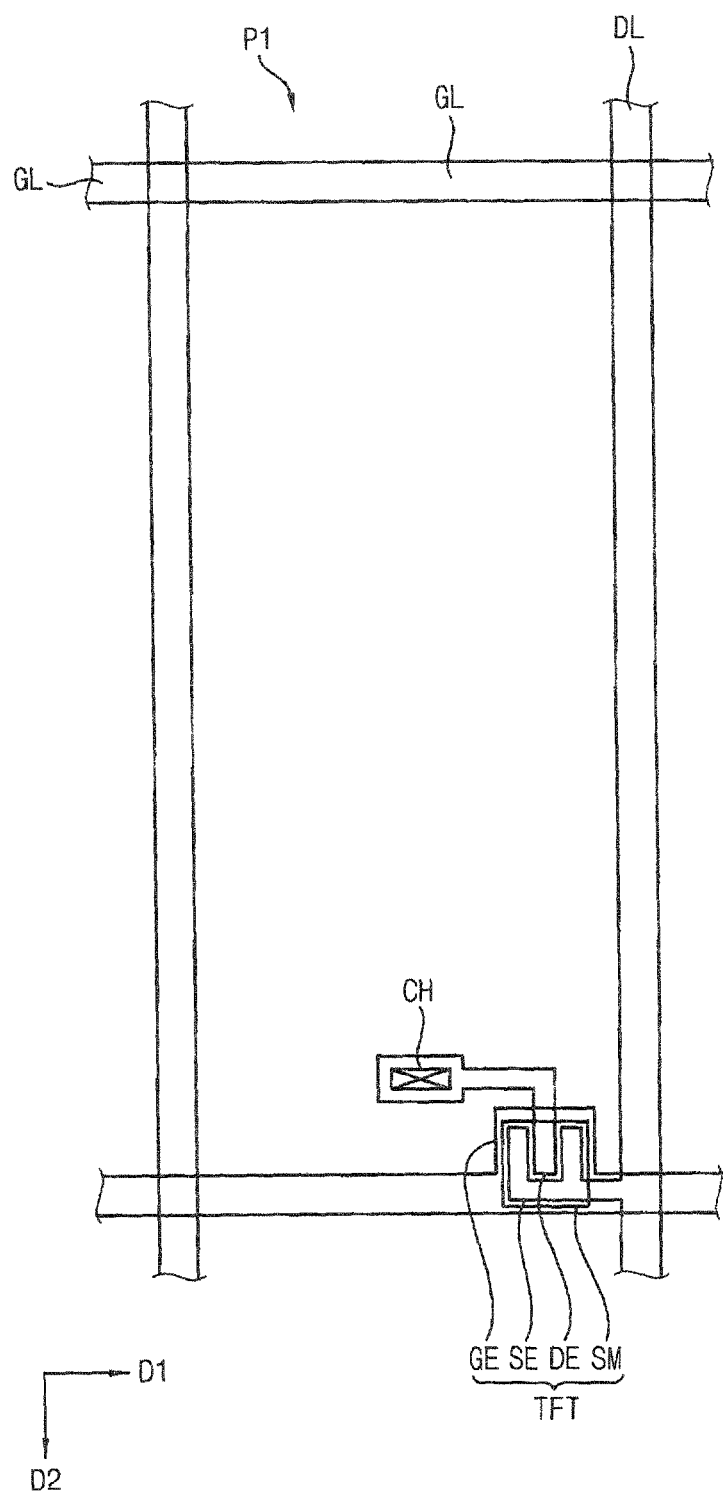
FIG. 2 is a plan view of a first pixel of FIG. 1.
Figure 3:
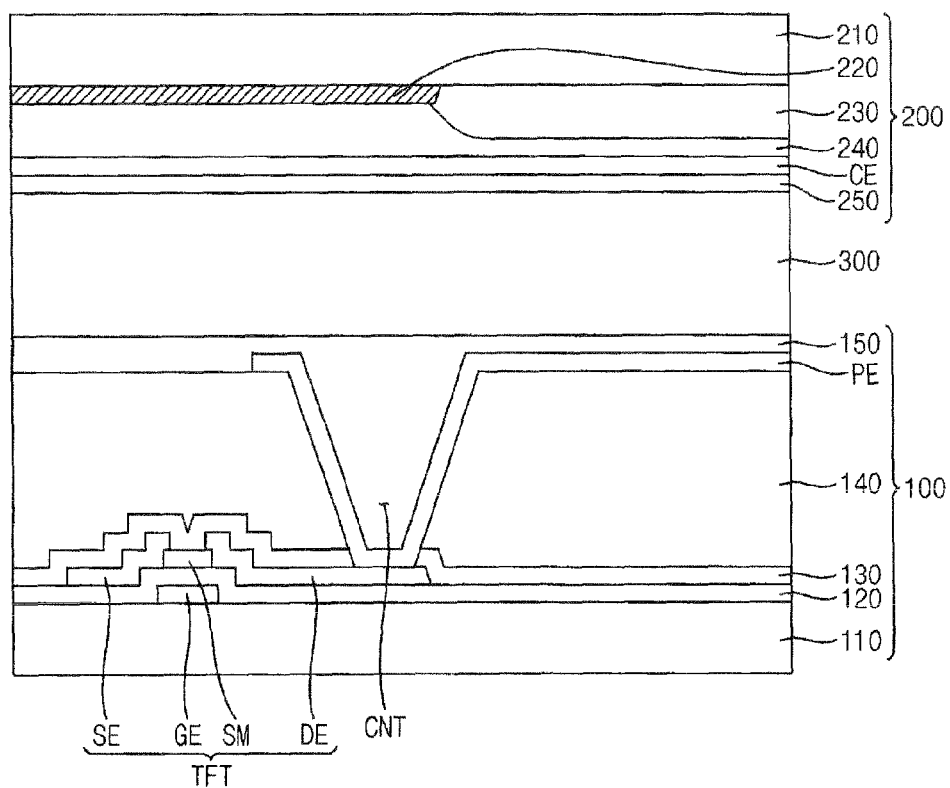
FIG. 3 is a cross-sectional view of a display panel according to an exemplary embodiment of the present invention.

FIG. 1 is a plan view of a display panel according to an exemplary embodiment of the present invention. FIG. 2 is a plan view of a first pixel of FIG. 1. FIG. 3 is a cross-sectional view of a display panel according to an exemplary embodiment of the present invention.

Referring to FIGS. 1 to 3, a display panel may include a plurality of gate lines GL, a plurality of data lines DL and a plurality of pixels P1.

The gate lines GL may extend in a first direction D1. The data lines DL may extend in a second direction D2, which is perpendicularly crossing the first direction D1.

The pixels P1 may be arranged in a matrix shape. The pixels may be disposed in areas defined by the gate lines GL and the data lines DL.

Each pixel may be connected to a corresponding gate line GL and a corresponding data line DL adjacent to the pixel.

Each pixel may have a rectangle shape extending in the second direction D2 and in the first direction D1. Alternatively, the pixel may have a V-shape, a Z-shape or the like.

Referring to FIGS. 1 to 3, the display panel may include a first substrate 100, a second substrate 200 and a liquid crystal layer 300.

The first substrate 100 may include a first base substrate 110, a thin film transistor TFT disposed on the first base substrate 110, a gate insulating layer 120, a data insulating layer 130, an organic layer 140, a pixel electrode PE and a first alignment layer 150.

The first base substrate 110 may be a transparent insulation substrate. For example, the transparent insulation substrate may be a glass substrate, a plastic substrate or the like. The first base substrate 110 may include a plurality of pixel areas for displaying an image. A plurality of the pixel areas may be disposed in a matrix shape having a plurality of rows and a plurality of columns.

Each pixel may further include a switching element. For example, the switching element may be the thin film transistor TFT. The switching element may be connected to the gate line GL and the data line DL adjacent to the switching element. The switching element may be disposed at a crossing area of the gate line GL and the data line DL.

A gate pattern may include a gate electrode GE and the gate line GL. The gate pattern may be disposed on the first base substrate 110. The gate line GL is electrically connected to the gate electrode GE.

The gate insulating layer 120 may be disposed on the first base substrate 110 to cover the gate pattern and may insulate the gate pattern.

A semiconductor pattern SM may be disposed on the gate insulating layer 120. The semiconductor pattern SM may overlap the gate electrode GE.

A data pattern may include the data line DL, a source electrode SE and a drain electrode DE. The data pattern may be disposed on the semiconductor pattern SM, which is formed on the gate insulating layer 120. The source electrode SE may overlap the semiconductor pattern SM. The source electrode SE may be electrically connected to the data line DL.

The drain electrode DE may be spaced apart from the source electrode SE on the semiconductor pattern SM. The semiconductor pattern SM may have a conductive channel between the source electrode SE and the drain electrode DE.

The TFT may include the gate electrode GE, the source electrode SE, the drain electrode DE and the semiconductor pattern SM.

The gate insulating layer 120 may be disposed on a whole surface of the first base substrate 110. For example, the gate insulating layer 120 may include silicon oxide (SiOx) or silicon nitride (SiNx). The gate insulating layer 120 may be formed in a single layer or a multi layer.

The data insulating layer 130 may be disposed on the gate insulating layer 120 to cover the data pattern and may insulate the data pattern. The data insulating layer 130 may be disposed on the gate line GL, the data line DL and the switching element. For example, the data insulating layer 130 may include silicon oxide (SiOx) or silicon nitride (SiNx). The gate insulating layer 120 may be formed in a single layer or a multi layer.

The organic layer 140 may be disposed on the date insulating layer 130. The organic layer 140 may flatten the date insulating layer 130. For example, the organic layer 140 may include an organic insulating material having an excellent flattening property and a photosensitivity. Alternatively, the organic layer 140 may be not formed.

The data insulating layer 130 and the organic layer 140 may include a contact hole CNT exposing a portion of the drain electrode DE.

The pixel electrode PE may be disposed on the organic layer 140. The pixel electrode PE may be electrically connected to the TFT through the contact hole CNT. The pixel electrode PE may be disposed on the pixel area. A grayscale voltage may be applied to the pixel electrode PE through the TFT.

For example, the pixel electrode PE may include a transparent conductive material, such as indium tin oxide (ITO), indium zinc oxide (IZO) and aluminum-doped zinc oxide (AZO). For example, the pixel electrode PE may have a slit pattern.

The first alignment layer 150 may be disposed on the organic layer 140 and the pixel electrode PE. The first alignment layer 150 may be disposed on a whole surface of the first base substrate 110. For example, the first alignment layer 150 may be disposed between the first base substrate 110 and the liquid crystal layer 300.

The first alignment layer 150 may align a liquid crystal molecule, which is adjacent to the first alignment layer 150.

The second substrate 200 may include a second base substrate 210, a black matrix 220 disposed on the second base substrate 210, color filters 230, an over coating layer 240, a common electrode CE and a second alignment layer 250.

The second base substrate 210 may be a transparent insulation substrate. For example, the transparent insulation substrate may be a glass substrate, a plastic substrate or the like.

The black matrix 220 may be disposed on the second base substrate 210. The black matrix 220 may block light corresponding to a signal line connected to the TFT.

The black matrix 220 may be disposed corresponding to an area of the first substrate 100, where the gate line GL, the data line DL and the switching element are disposed. The black matrix 220 may overlap with the gate line GL extended in the first direction D1 and the data line DL extended in the second direction D2 perpendicular to the first direction D1 thereto block light. The black matrix 220 may be formed in a border between pixel areas adjacent to each other.

For example, the black matrix 220 may include a photosensitive organic material including a pigment such as carbon black or the like.

The color filters 230 may be disposed on the second base substrate 210 and the black matrix 220.

The color of light may be changed by the color filters 230 and the light may penetrate the liquid crystal layer 300. The color filters 230 may include a red color filter, a green color filter and a blue color filter. Each of the color filters 230 may correspond to one of the pixel areas. The color filters 230, which are adjacent to each other, may have different colors from each other.

For example, the color filters 230 may be spaced apart from a border between pixel areas adjacent to each other. The black matrix 220 may be disposed on the border between pixel areas adjacent to each other.

The over coating layer 240 may be disposed on the second base substrate 210 to flatten an upper surface of the second substrate 200. For example, the over coating layer 240 may be formed on the black matrix 220 and the color filters 230.

For example, the over coating layer 240 may include silicon oxide (SiOx) or silicon nitride (SiNx).

The common electrode CE may be disposed on the over coating layer 240. For example, the common electrode CE may include a transparent conductive material, such as indium tin oxide (ITO), indium zinc oxide (IZO) and aluminum-doped zinc oxide (AZO).

The second alignment layer 250 may be disposed on the common electrode CE. The second alignment layer 250 may be disposed on a whole surface of the second base substrate 210. For example, the second alignment layer 250 may be disposed between the second base substrate 210 and the liquid crystal layer 300.

The second alignment layer 250 may align a liquid crystal molecule, which is adjacent to the second alignment layer 250.

The liquid crystal layer 300 may be disposed between the first substrate 100 and the second substrate 200. For example, the liquid crystal layer 300 may include liquid crystal molecules. An alignment of the liquid crystal molecules in the liquid crystal layer 300 may be controlled by an electric field applied between the pixel electrode PE and the common electrode CE. Therefore, a light transmittance of the pixel may be controlled.

Figure 4:
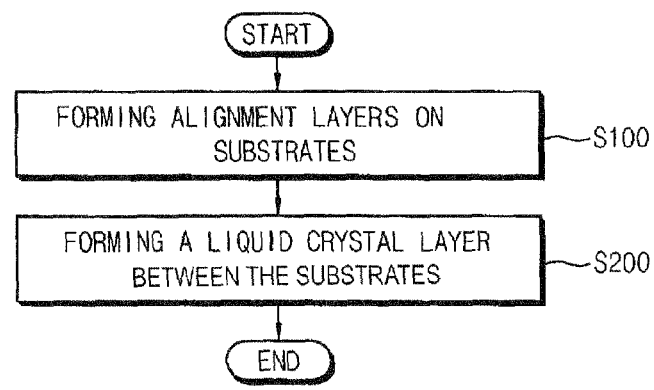
FIG. 4 is a diagram illustrating a method of manufacturing a display panel according to an exemplary embodiment of the present invention.

FIG. 4 is a diagram illustrating a method of manufacturing a display panel according to an exemplary embodiment of the present invention.

Referring to FIGS. 1 to 4, the method of manufacturing a display panel is provided. An alignment layer may be formed on a first substrate 100; and another alignment layer may be formed on a second substrate 200 as step one of S100. A liquid crystal layer may be formed between the substrates as step two of S200. Therefore, a display panel may be manufactured.

Specifically, a photo-alignment composition may be coated on the first substrate 100 and the second substrate 200, thus forming the alignment layers 150 and 250. The photo-alignment composition may include a compound including a repeat unit represented by the Chemical Formula 1.

For example, the photo-alignment composition may be coated by a slit coating, a spin coating or the like.

The photo-alignment composition may be coated on the first base substrate 110 and the second base substrate 210 respectively. The first base substrate 110 and the second base substrate 210 may be firstly baked. Light having a wavelength range of about 200 nm to about 300 nm may be irradiated to the base substrates 110 and 210. And then, the first base substrate 110 and the second substrate 210 may be secondly baked, thus forming the alignment layers 150 and 250.

The compound may be formed by a condensation polymerization reaction of cyclobutane-1,2,3,4-tetracarboxylic dianhydride derivative represented by the Chemical Formula 8, and a diamine compound.

For example, the diamine compound may be

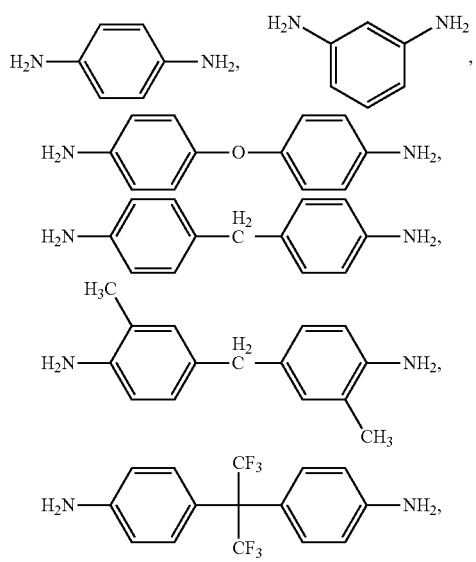

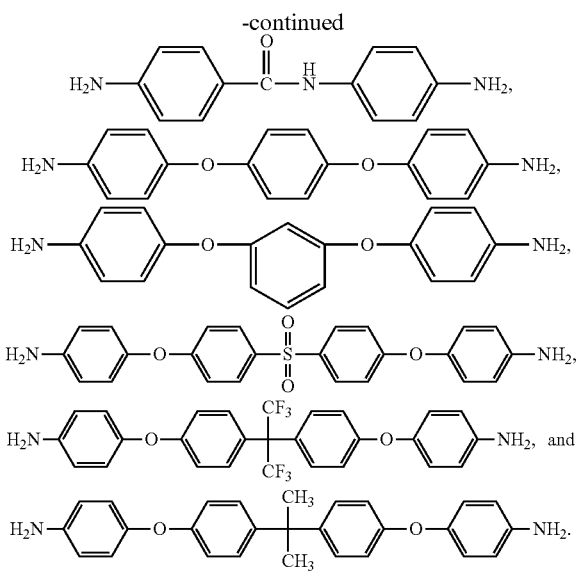

The photo-alignment composition may be formed by a composition including cyclobutane-1,2,3,4-tetracarboxylic dianhydride derivative, a diamine compound and a solvent. The photo-alignment composition may be formed by a condensation polymerization reaction by heating at a temperature range of about 150° C. to about 450° C.

An equivalence ratio of the cyclobutane-1,2,3,4-tetracarboxylic dianhydride derivative and the diamine compound may be 1:1.

Therefore, the compound having a desired weight-average molecular weight may be formed.

The photo-alignment composition may be coated on the first base substrate 110 and the second base substrate 210, and then the first base substrate 110 and the second base substrate 210 may be firstly baked. A solvent, which is included in the photo-alignment composition, may be removed by firstly baking. Thus, an alignment layer having a random alignment may be formed.

The alignment layer having a random alignment may be exposed to light. When the light is irradiated to the alignment layer, the photo-alignment composition may be decomposed, thus rearranging the photo-alignment composition.

The alignment layer may be exposed to ultraviolet rays, and then the alignment layer may be secondly baked. Therefore, molecules having a small weight-average molecular weight, which is included in the photo-alignment composition, may be removed. Thus, the alignment layers 150 and 250, coated by the photo-alignment composition having the weight-average molecular weight of 100,000 to 1,000,000, may be formed.

A liquid crystal material may be injected between the first substrate 100 and the second substrate 200 thus forming the liquid crystal layer 300.

According to an exemplary embodiment of the present invention, a photo-alignment composition and a method of manufacturing a display panel using the photo-alignment composition may be used for a liquid crystal display apparatus, an organic light emitting display apparatus or the like.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A photo-alignment composition comprising:
a compound comprising a repeat unit represented by the following Chemical Formula 1; and
a solvent,

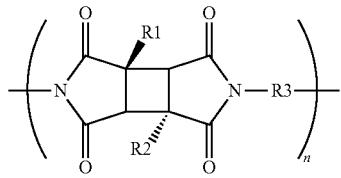
<Chemical Formula 1> wherein R1 and R2 respectively represent an alkyl group having 1 to 20 carbons, R3 represents a diamine group, and n is a natural number; at least one hydrogen atom of the alkyl group is substituted by a hydrogen bonding functional group represented by the following Chemical Formula 2 to the following Chemical Formula 7,

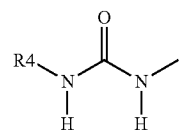
<Chemical Formula 2>

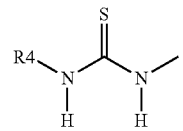
<Chemical Formula 3>

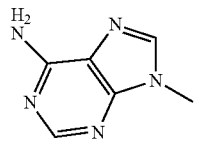
<Chemical Formula 4>

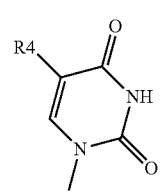
<Chemical Formula 5>

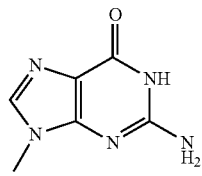
<Chemical Formula 6>

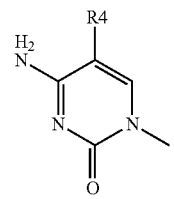
<Chemical Formula 7> wherein R4 represents an alkyl group having 1 to 20 carbons.

2. The photo-alignment composition of claim 1, wherein at least two hydrogen bonding functional groups of adjacent molecules form an intermolecular hydrogen bond.

3. The photo-alignment composition of claim 1, wherein a terminal of the hydrogen bonding functional group comprises a nitrogen atom forming a covalent bond with the alkyl group.

4. The photo-alignment composition of claim 1, wherein the Chemical Formula 4 is an adenine group, the Chemical Formula 5 is a thymine group, the Chemical Formula 6 is a guanine group, the Chemical Formula 7 is a cytosine group, and
wherein the adenine group is bonded to the thymine group, and the guanine group is bonded to the cytosine group.

5. The photo-alignment composition of claim 1, wherein the compound is formed by a condensation polymerization reaction of cyclobutane-1,2,3,4-tetracarboxylic dianhydride derivative represented by the following Chemical Formula 8 and a diamine compound,

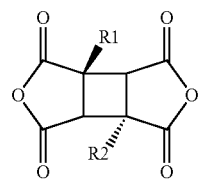
<Chemical Formula 8>

Wherein definitions of R1 and R2 are the same as described in claim 1.

6. The photo-alignment composition of claim 5, wherein the diamine compound comprises at least one selected from the group consisting of

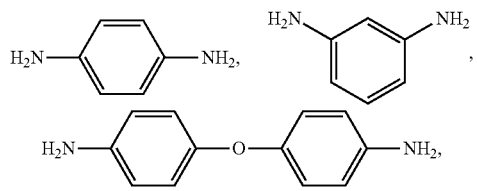

-continued

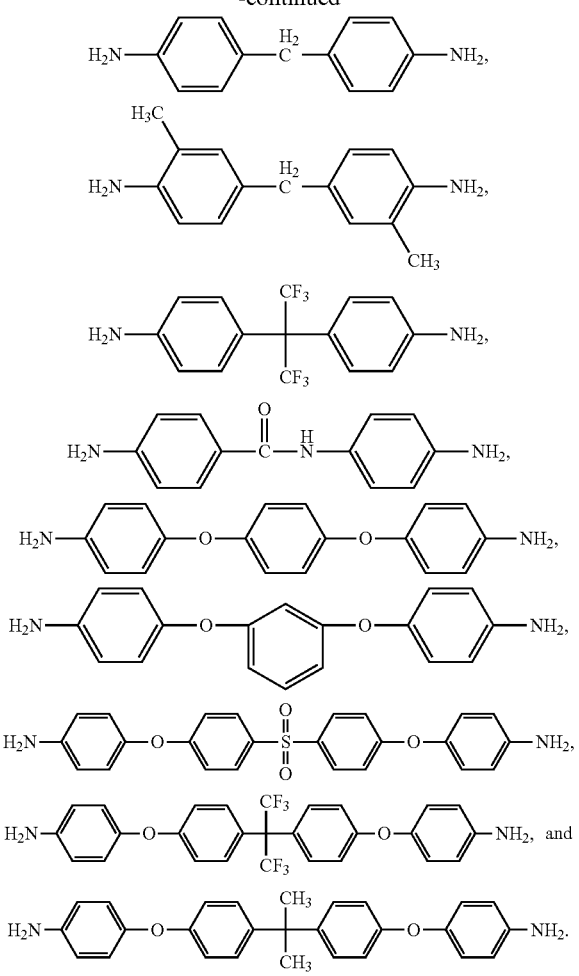

7. The photo-alignment composition of claim 6, wherein R3 is derived from the diamine compound, and R3 comprises an aromatic group comprising at least one selected from the group consisting of

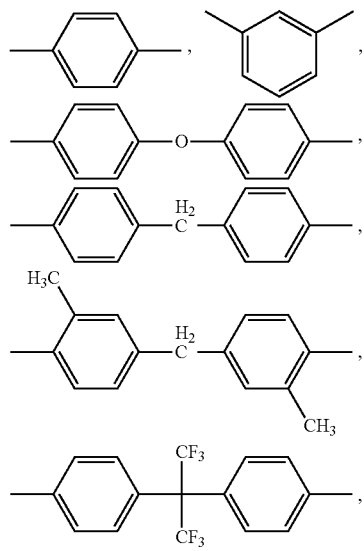

-continued

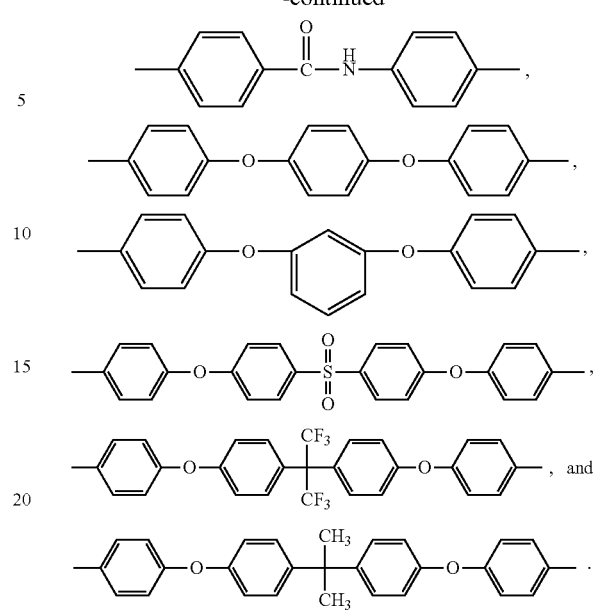

8. The photo-alignment composition of claim 7, wherein at least one hydrogen atom of the aromatic group is substituted by the hydrogen bonding functional group represented by the Chemical Formula 2 to the Chemical Formula 7.

9. The photo-alignment composition of claim 7, wherein R3 further comprises a linker positioned at a terminal of the aromatic group, and the linker comprises an alkyl group having 1 to 20 carbons,
wherein at least one hydrogen atom of the linker is substituted by the hydrogen bonding functional group represented by the Chemical Formula 2 to the Chemical Formula 7.

10. The photo-alignment composition of claim 1, wherein the photo-alignment composition absorbs light having a wavelength range of about 200 nm to about 300 nm.

11. The photo-alignment composition of claim 1, wherein a weight-average molecular weight of the compound is within a range of about 100,000 to about 1,000,000.

12. The photo-alignment composition of claim 1, wherein the solvent comprises at least one selected from the group consisting of chlorobenzene, N-methyl pyrrolidone, dimethyl sulfoxide, dimethyl formamide, toluene, chloroform, γ-butyrolactone, methyl cellosolve, butyl cellosolve, butyl carbitol and tetrahydrofuran.

13. A method of manufacturing a display panel comprising:
    forming an alignment layer by coating a photo-alignment composition on a first substrate;
    forming an alignment layer by coating the photo-alignment composition on a second substrate facing the first substrate; and
    forming a liquid crystal layer between the first substrate and the second substrate, wherein
    the photo-alignment composition comprising a compound comprising a repeat unit represented by the following Chemical Formula 1; and a solvent, <Chemical Formula 1>

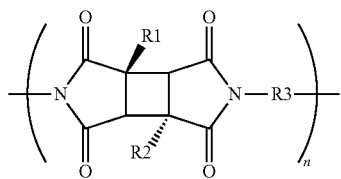

wherein R1 and R2 respectively represent an alkyl group having 1 to 20 carbons, at least one hydrogen atom of the alkyl group is substituted by a hydrogen bonding functional group represented by the following Chemical Formula 2 to the following Chemical Formula 7, R3 represents a diamine group, n is a natural number, <Chemical Formula 2>

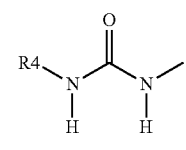

<Chemical Formula 3>

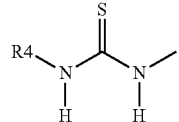

<Chemical Formula 4>

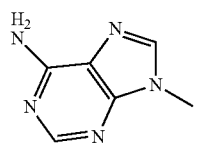

<Chemical Formula 5>

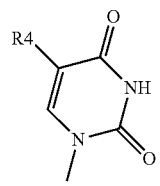

<Chemical Formula 6>

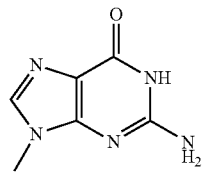

<Chemical Formula 7>

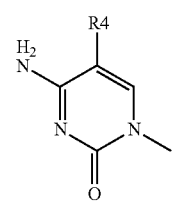

wherein R4 represents an alkyl group having 1 to 20 carbons.

14. The method of claim 13, wherein a terminal of the hydrogen bonding functional group comprises a nitrogen atom forming a covalent bond with the alkyl group.

15. The method of claim 13, wherein forming the alignment layers comprises:

coating the photo-alignment composition on the first substrate and the second substrate;
firstly baking the coated first substrate and the coated second substrate;
irradiating light having a wavelength range of about 200 nm to about 300 nm to the coated first substrate and the coated second substrate; and
secondly baking the coated first substrate and the coated second substrate after the irradiating.

16. The method of claim 13, wherein the compound is formed by a condensation polymerization reaction of cyclobutane-1,2,3,4-tetracarboxylic dianhydride derivative represented by the following Chemical Formula 8, and a diamine compound, <Chemical Formula 8>

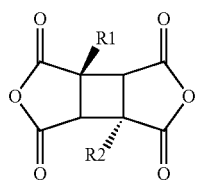

Wherein definitions of R1 and R2 are the same as described in claim 13.

17. The method of claim 16, wherein the diamine compound comprises at least one selected from the group consisting of

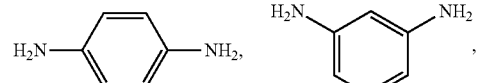

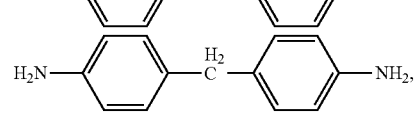

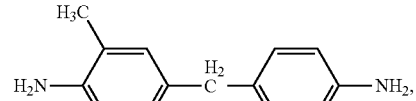

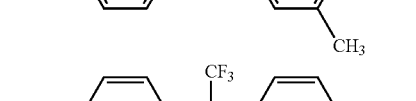

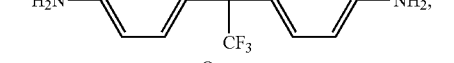

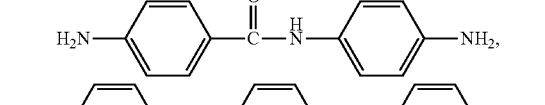

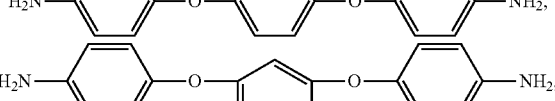

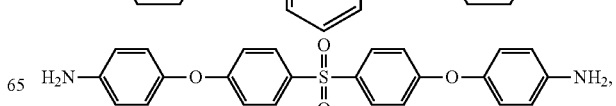

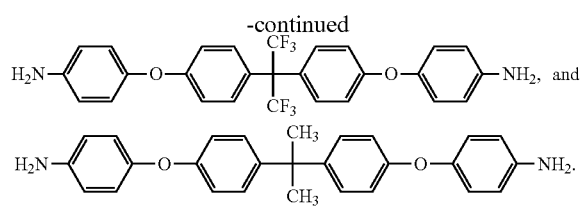

18. The method of claim 17, wherein R3 is derived from the diamine compound, and R3 comprises an aromatic group comprising at least one selected from the group consisting of

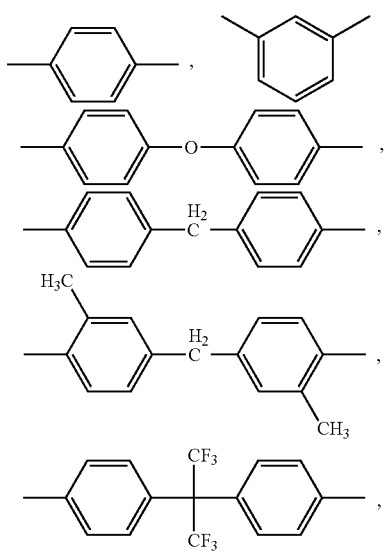

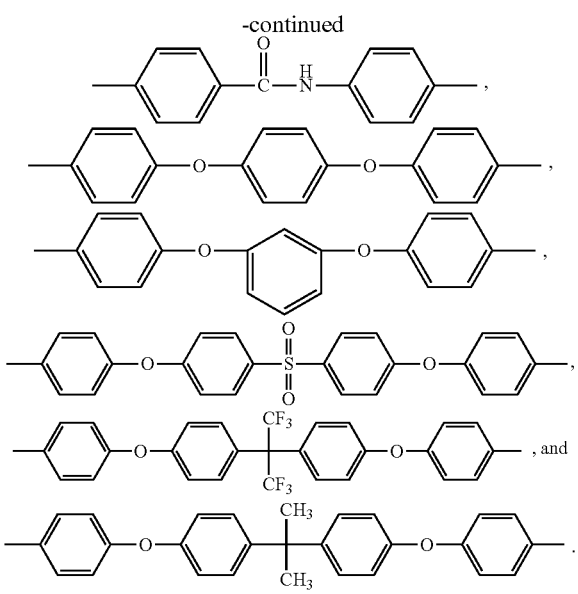

19. The method of claim 18, wherein at least one hydrogen atom of the aromatic group is substituted by a hydrogen bonding functional group represented by the Chemical Formula 2 to the Chemical Formula 7.

20. The method of claim 17, wherein diamine compound further comprises a linker comprising an alkyl group having 1 to 20 carbons,
wherein at least one hydrogen atom of the linker is substituted by the hydrogen bonding functional group represented by the Chemical Formula 2 to the Chemical Formula 7.

* * * * *